United States Patent [19]

Akin

[11] Patent Number: 4,601,084
[45] Date of Patent: Jul. 22, 1986

[54] MEANS FOR ADJUSTING AN EXTRACTOR FOR COTTON STRIPPER

[76] Inventor: Hurston B. Akin, Rte. 1, Davidson, Okla. 73530

[21] Appl. No.: 744,158

[22] Filed: Jun. 13, 1985

[51] Int. Cl.⁴ .............................................. D01G 1/00
[52] U.S. Cl. ......................................... 19/202; 19/95
[58] Field of Search ............ 19/200, 202, 105, 106 R, 19/95

[56] References Cited

U.S. PATENT DOCUMENTS

| | | | |
|---|---|---|---|
| 2,289,017 | 7/1942 | Jenkins et al. | 19/95 X |
| 3,032,830 | 5/1962 | Van Doorn et al. | 19/202 |
| 4,310,950 | 1/1982 | Cox | 19/202 |
| 4,449,272 | 5/1984 | Cash | 19/105 |

Primary Examiner—Louis K. Rimrodt
Attorney, Agent, or Firm—Drude Faulconer

[57] ABSTRACT

A means for adjusting the clearance between the grid plate assembly and the drum of an extractor of the type which separates trash from cotton lint as it passes through this clearance. The present means is easily and quickly installed on commercially-available extractors or new extractors and is fully operable from outside the housing of the extractor. The adjusting means comprises a pair of supports or brackets which are positioned on the outside of a side wall of the extractor housing. One of the brackets is fixed to the wall while the other bracket is connected to the grid plate assembly by a bolt that passes through an elongated slot in the wall. The two brackets are connected together by an adjustable member (e.g. all-thread bolt) having jam nuts thereon which, in turn, can be moved along the adjustable member to thereby allow the other bracket and, hence, the grid plate assembly to move either toward or away from the drum to change the clearance therebetween. Once the grid plate assembly is properly positioned, the threaded member and the jam nuts are tightened to lock the grid plate assembly in position. Indicia is provided on the outside of the side wall to indicate the actual clearance inside the extractor.

13 Claims, 7 Drawing Figures

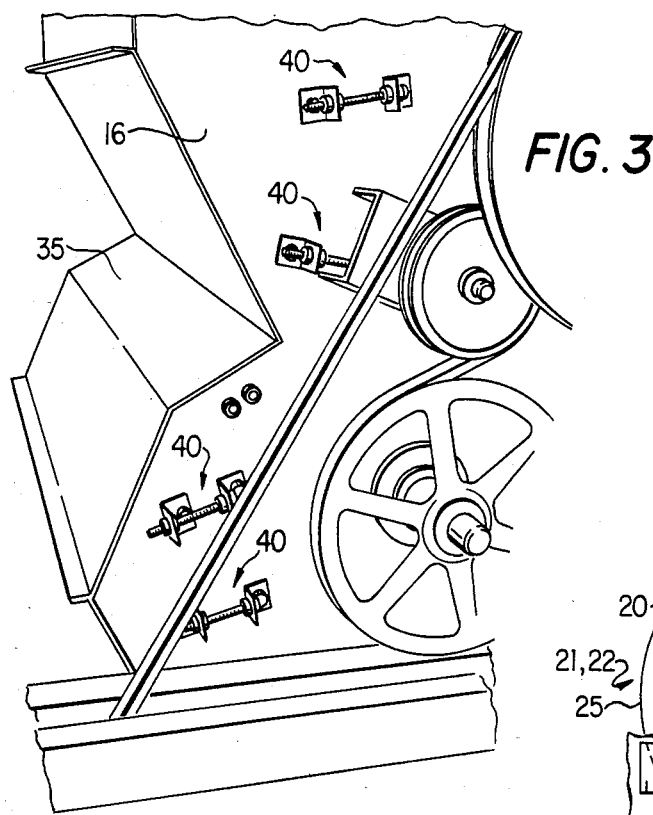
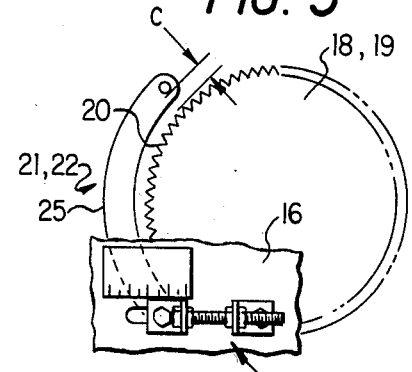
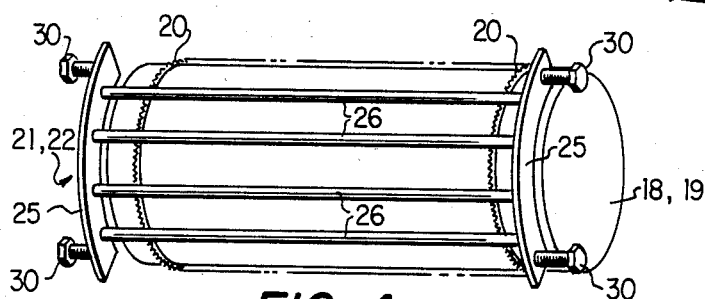
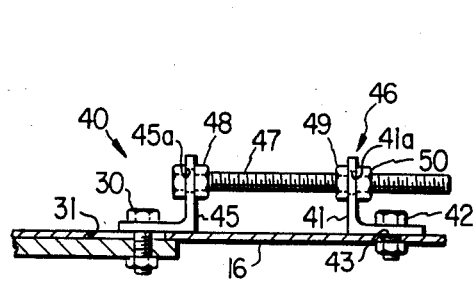
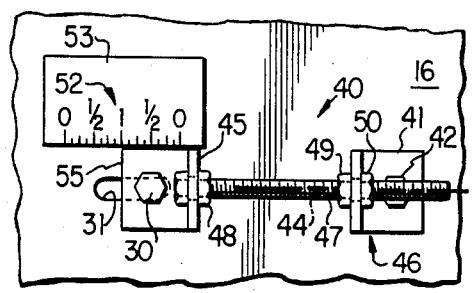

MEANS FOR ADJUSTING AN EXTRACTOR FOR COTTON STRIPPER

DESCRIPTION

1. Technical Field

The present invention relates to an extractor unit used in cotton processing equipment and more particularly relates to a means for adjusting the clearance between the grid plate assembly and the saw teeth carried by a rotating drum in an extractor of the type used both on mobile cotton strippers and in cotton gin installations.

2. Background Art

In a typical cotton harvesting machine, commonly called a "cotton stripper", the cotton bolls are stripped from the stalks by a plurality of spaced fingers as the stripper moves through the field. Dirt is removed from the harvested material before the material is conveyed to a separating chamber where a stream of air lifts the lighter mature bolls of cotton into a breaker cylinder. The burrs are loosened from the lint in the bolls in the breaking cylinder from which the harvested material is conveyed to an extractor.

This extractor has basically the same construction as the "stick machines" used in certain cotton gin installations. A typical extractor of the type involved is comprised of rotating drums having saw-like teeth thereon, a doffer, a grid plate assembly for each drum, and a rotary air seal. As the material enters the extractor, the lint becomes attached to the saw teeth on the drums and is carried around to the doffer which, in turn, removes the lint from the teeth and delivers it to a collection bin or basket.

Burrs, sticks, and other trash contact the grid plate assemblies and are thereby separated from the cotton lint as it passes through the extractor. The clearance between the grid plate assemblies and the saw teeth on the drums is adjustable so that if more cleaning of trash from the lint is desired, the clearance is reduced. However, if the clearance is too close for a particular crop condition, the extractor will kick tuffs of lint out of the rotary seal and back onto the ground, thereby resulting in the loss of valuable product. If the clearance is too wide, it will cause excessive trash to be passed with the lint of the cotton to the basket.

In present known extractors of the type described above, the manufacturer normally provides a set of gauges (i.e. feeler gauges) for use in setting the clearances to certain desired values. To use these gauges, a cover has to be removed from the extractor to expose the drums and grid plate assemblies and a plurality of bolts, normally two on each side of the extractor housing, have to be loosened for each grid plate assembly. Each bolt is moved within a slot in said housing while an operator physically positions the gauge between the grid plate assembly and the saw teeth on a respective drum. The grid plate assembly then has to be carefully held in the desired position until all of the bolts are retightened to lock the grid plate assembly in position.

It can be seen from the above that this means for adjusting the grid plate assemblies has several drawbacks which are time consuming and potentially hazardous to an operator making the adjustment. First, even though the adjustment procedure is obviously to be carried out while the drums are at rest, the operator is nevertheless exposed to the extremely sharp saw teeth on the drums as he positions the feeler gauge between the grid plate assembly and the teeth. The possibility that he may cut himself and be seriously injured is always present. Further, since he must position the gauge inside the extractor housing, the drum cover must be removed and replaced each time an adjustment is to be made, thereby requiring extra time and effort on his part. Still further, since the operator must loosen bolts located at opposite sides of the extractor housing, hold the gauge inside the housing, and then tighten the bolts while holding the grid plate assembly in position, it is difficult and sometimes frustrating for one person to carry out the adjustment procedure.

Also, the bolts which secure the grid plate assemblies in position may work loose during operation which allows the grid plate assemblies to move thereby changing the previously set clearances. This change in clearance is not detectable from visable observation, but only becomes apparent when cotton lint appears on the ground or excessive trash appears in the basket. When this occurs, the operation has to be stopped and the clearance between a grid plate assembly and the saw teeth on the drum have to be readjusted before the operation is continued. It can be seen that this may involve a substantial delay in the cotton stripping operation, especially if the special feeler gauges have been lost, misplaced, or otherwise not immediately available.

In view of the above, it can be seen that a means is needed to adjust the grid plate assemblies of an extractor unit which does not expose the operator to the saw teeth on the drums; does not require any special gauges to effect the desired clearances; allows a single operator to quickly carry out the adjustment procedure; and does not require any removal of the drum cover from the extractor to effect the adjustments.

DISCLOSURE OF THE INVENTION

The present invention provides a means for adjusting the clearance between the grid plate assembly and the drum of an extractor of the type which separates trash from cotton lint as it passes through this clearance. The present adjusting means can be easily and quickly installed on existing, commercially—available extractors or on new extractors and is fully operable from outside the housing of the extractor so that no covers have to be removed, no gauges are needed, and the operator never needs to be exposed to the teeth on the drum within the housing.

More specifically, the adjusting means of the present invention comprises a pair of supports or brackets which are positioned on the outside of a side wall of the extractor housing. One of the brackets is fixed to the wall while the other bracket is connected to an end plate of the grid plate assembly by a threaded member that passes through an elongated slot in the wall. The two brackets are connected together by an adjustable member (e.g. all-thread bolt) having jam nuts thereon which, in turn, can be threaded along the adjustable member to allow the other bracket and, hence, the grid plate assembly connected thereto to move either toward or away from the drum to accurately adjust the clearance therebetween. Once the grid plate assembly is properly positioned, the threaded member and the jam nuts are tightened to lock the grid plate assembly in position.

To install the present means into an existing extractor, the bolts which extend through respective elongated slots in the side walls of the extractor housing and which adjustably hold the grid plate assembly in position within the housing are removed. The bolts are removed one by one as an adjusting means is installed at each bolt location. One bracket is positioned over the slot and is secured to the grid plate by the same bolt just removed or by an equivalent threaded member. This bolt passes through an opening in one leg of the bracket, through the elongated slot in the side wall, and into the same threaded opening on the grid plate assembly from which the original bolt was removed.

A hole is drilled in the side wall at a point spaced from the slot and lying on an extension of the logitudinal centerline of the slot. The other bracket is secured to the side wall over this hole. The adjustable member connects the spaced brackets together. With the bolt and the jam nuts loosened, a feeler gauge is positioned between the drum and the grid plate assembly. The grid plate assembly is moved to provide a clearance corresponding to the gauge, and an indicia means (e.g. decal) is fixed on the outside of the side wall adjacent the bracket over the slot. The indicia means is positioned so that a mark thereon which is representative of the known clearance will be aligned with a reference point on the bracket. This procedure is repeated for each bolt after which the bolts and jam nuts are tightened, the gauge is removed, and any covers replaced.

When it becomes necessary to change the clearance, the bolts and jam nuts are loosened and the reference mark on the bracket is aligned with the proper indicia mark to provide the desired clearance. The bolts and jam nuts are then retightened to lock the grid plate assembly in place. The jam nuts on the adjustable member lock the brackets in a spaced relationship which prevents any inadvertent change in clearance even if the bolt becomes loose during operations.

BRIEF DESCRIPTION OF THE DRAWINGS

The actual construction, operation, and apparent advantages of the present invention will be better understood by referring to the drawings in which like numerals identify like parts and in which:

FIG. 3 is a partial side view of the extractor of FIG. 2, but incorporating the present invention;

FIG. 4 is a simplified perspective view of a drum and a rod grid of an extractor unit;

FIG. 5 is an end view, broken away, showing the present invention relative to a drum and rod grid of an extractor unit;

FIG. 6 is a top view of the adjustment means of the present invention; and

FIG. 7 is a side view of the adjustment means of FIG. 6.

BEST MODE FOR CARRYING OUT THE INVENTION

Figure 1:
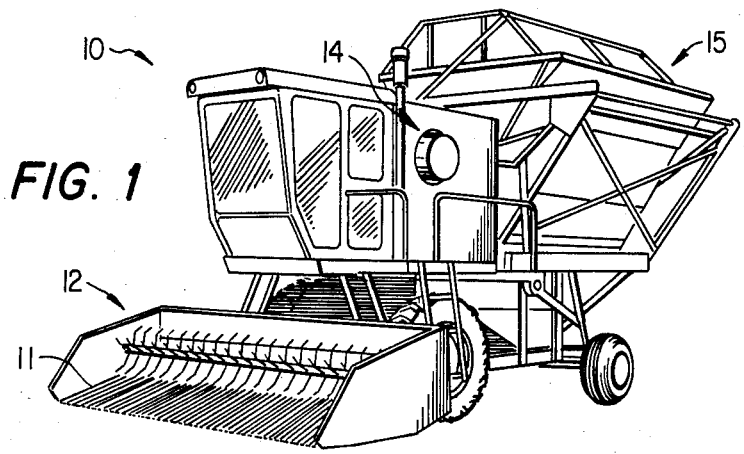
FIG. 1 is a perspective view of a typical cottong stripper having an extractor unit incorporating the present invention.

Referring now to the drawings, FIG. 1 discloses a typical mobile cotton harvesting machine 10 (called a "stripper") of the type which is commercially available from a variety of manufacturers (e.g. a Model 860 Self Propelled Cotton Stripper, manufactured by Allis-Chalmers, Milwaukee, Wis.). Although all of the internal details of stripper 10 are not shown, a brief description of its operation will be helpful in better appreciating the present invention.

As stripper 10 moves through a field, a plurality of spaced fingers 11 in header 12 strips the cotton bolls from the stalks. The harvested material is coveyed by a cross auger over grids (not shown) to remove dirt and is then elevated by a conveyor belt to a separating chamber (not shown) in the stripper 10. Air from fans in the stripper flows upward through the separating chamber at a velocity sufficient to lift the lighter mature bolls but not sufficient to lift the heavier green bolls and foreign material such as rocks, clods, and roots. This heavier material falls from the separating chamber and is conveyed to a green boll box (not shown) which is emptied at the end of the field. The mature bolls are carried by the air into a breaker cylinder 13 (FIG. 2) which loosens the burrs from the lint of the bolls (the desired product) and evens out the flow of material as it enters extractor 14. The extractor 14, which will be explained in detail below, separates trash (e.g. sticks, etc.) from the lint before the lint is conveyed to the basket 15 where it is accumulated until it is unloaded from stripper 10 for further processing.

Figure 2:
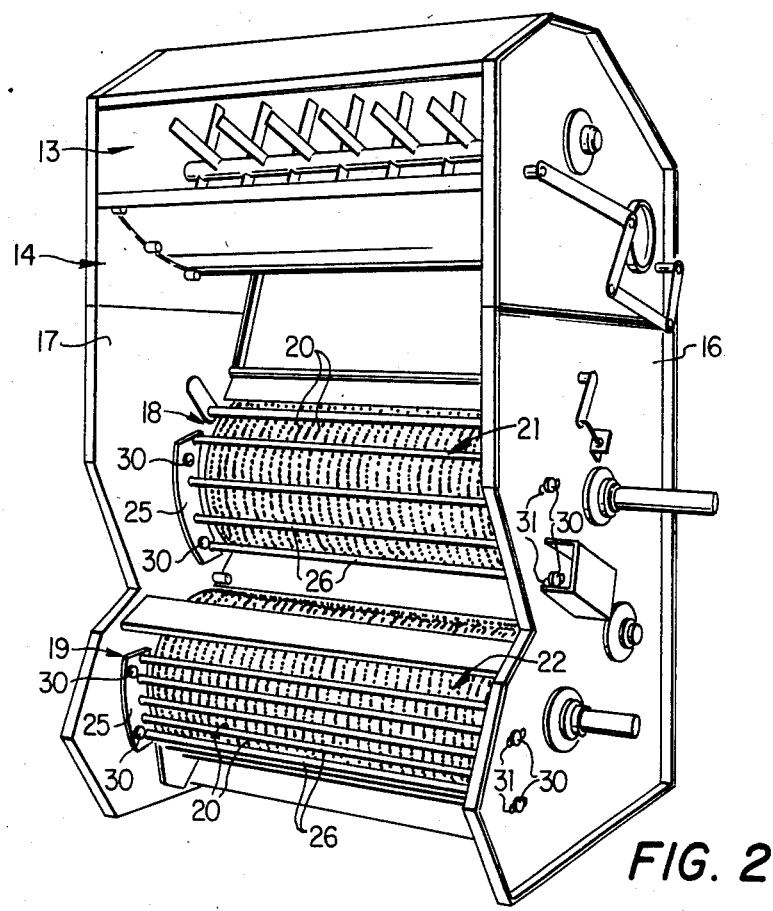
FIG. 2 is a perspective view of a typical, known extractor unit in which the present invention is to be used.

As shown in FIG. 2, a typical extractor 14 of the type presently involved is comprised of a housing having two opposed side walls 16, 17. Extractor 14 has two drums 18, 19 which are journalled for rotation between sides 16, 17. Each drum has a plurality of rows of saw-like-teeth 20 thereon for a purpose to be described below. Positioned in front of drums 18, 19 and spaced therefrom are grid plate assemblies 21, 22, respectively. Grid plate assemblies 21, 22 are both similar in construction and as seen in FIGS. 2 and 4 are comprised of a pair of end plates 25 that are connected together by a plurality of spaced parallel rods 26. Grid plate assemblies 21, 22 are mounted in the housing of the extractor and held in place by means of adjusting bolts or capscrews 30 (FIG. 4) which extend through respective elongated slots 31 in respective sides 16, 17 of the housing.

Extractor 14, as described to this point is identical to known, prior art extractors. Extractors having this construction are not only used in mobile cotton strippers as described but are also used (some times called "stick machines") in cotton gin installations to remove burrs, sticks, leaf trash and other foreign material from the harvested cotton.

As explained above, the burrs are loosened from the lint in breaker cylinder 13 and are passed through flow baffle 33 (FIG. 2) and onto rotating drums 18, 19 of extractor 14. As the lossened bolls enter extractor 14, the lint becomes attached to the saw teeth 20 on the rotating drums 18, 19 and is carried by the saw teeth 20 to a doffer (not shown) which removes the lint from the saw teeth 20 and delivers it to a stream of air which, in turn, carries the lint to basket 15. Trash (e.g. burrs, sticks, etc.) contact the respective rod grid plate assemblies 21, 22 and are separated from the cotton lint. The trash drops from extractor 14 and is deposited back on the ground.

It is extremely important that the clearance C (FIG. 5) between the saw teeth 20 on drums 18, 19 and rods 26 of grid plate assemblies 21, 22, respectively, be adjusted and maintained at a value which will provide the best cleaning of trash from the lint without losing substantial amounts of lint. In other words, if the rod grid plate assemblies are too close for a particular crop condition, tuffs of lint will be kicked out of the rotary seal (not shown) and back onto the ground resulting in the loss of the valuable harvested product. If clearance C is too wide, excessive trash will be passed with the lint to basket 15, also an undesirable condition.

In the prior art extractors of the type described, a cover 35 (FIG. 3) is removed to expose drums 18, 19 and their respective grid plate assemblies 21, 22. Bolts or capscrews 30 are loosened and moved within their respective slots 31. A feeler gauge (not shown) for the desired clearance C is positioned between a drum and the rods 26 of its respective grid plate assembly and the assembly is held at this clearance while bolts or capscrews 30 are retightened. It can be seen that this adjustment procedure requires substantial time and effort on the part of the operator and exposes him to possible contact with saw teeth 20 on the drums.

Turning now to the present invention, adjusting means 40 (FIGS. 3, 5, 6, 7) is provided for adjusting the clearance C between a drum and its grid assembly. Means 40 is one that can be easily and quickly operated by a single operator and one which never requires exposure of the operator to the saw teeth 20 inside the extractor housing. Also, the present adjusting means provides a visual reading of clearance C from outside the extractor housing so any change in the desires clearance C due to the loosening of the grid plate assembly bolts can quickly be determined. Adjusting means 40 can be marketed as a kit which can quickly be installed onto presently existing extractors of the type described above or it can be installed as part of the original equipment of an extractor.

Referring more specifically to FIGS. 3, 5, 6, 7, adjusting means 40 is disclosed for accurately adjusting the clearance C between a drum 18, 19 and its respective grid plate assembly 21, 22. Since all of the adjusting means 40 (one for each bolt 30) are similar in both construction and operation, only one will be described in detail.

Adjusting means 40 is comprised of a first support or L-shaped bracket 41 which is secured to side 16 or 17, as the case may be, by a bolt 42 or the like which extends through a first leg of bracket 41 and hole 43 in the side 16. Hole 43 is spaced from slot 31 and lies on an extension (FIG. 7) of the longitudinal centerline or axis 44 of slot 31. A second support or L-shaped bracket 45 is secured to plate 25 of a respective grid plate assembly 21, 22 by a threaded member (e.g. bolt 30) which extends through a first leg of bracket 44 and slot 31 (FIG. 6). Adjustable member 46 connects brackets 42 and 45 together. As illustrated, member 46 is comprised of an all-thread bolt 47. Bolt 47 passes through opening 45a in the second leg of bracket 45 and is secured thereto by lock nut 48. The other end of bolt 47 passes through opening 41a in the second leg of bracket 41 and is adjustably secured thereto by a pair of jam nuts 49, 50.

After the brackets of adjusting means 40 have been installed on extractor 14, all four bolts 30 and jam nuts 49, 50 on adjusting member 46 are loosened and a feeler gauge for a known clearance C (e.g. 1 inch) is positioned between a drum and its respective grid plate assembly in the same manner as was done in the prior art. The grid plate assembly is moved to the desired clearance as determined by the guage and bolts 30 and jam nuts 49, 50 are tightened to secure the grid plate assembly in position. While in this known clearance position, indicia 52 is provided adjacent each bracket 45 to clearly indicate the known clearance C. While indicia 52 can be painted or otherwise provided at the appropriate positions on the respective sides 16, 17 of the extractor housing, preferably a decal 53 having indicia 52 on the front thereof and having an adhesive backing is provided for each adjusting means 40. The decal can be easily and quickly applied at its appropriate location at the time of installation. Decal 53 or other indicia is positioned so that a reference point (e.g. edge 55 of bracket 45) on bracket 45 will lie adjacent an indicia mark corresponding to the known clearance C (e.g. 1 inch in FIG. 7). Of course, a different reference point on bracket 45 (e.g. a pointer mounted on bracket 45) can be used as long as it corresponds to the proper indicia for a known clearance C. By numbering the indicia 52 as shown in FIG. 7 (i.e. start at "0" at either end), a single decal design can be used for all locations (i.e. either side 16, 17).

Once adjusting means 40 is installed and an initial clearance is set, all further adjustments for other clearances C can easily be made without removing cover 35 or without the need for separate feeler gauges. To carry out an adjustment, bolts 30 on a grid plate assembly are loosened just enough to allow the bolts to move in their respective slots 31. Jam nuts 49, 50 are loosened so that bolt 47 can be moved within opening 41a of bracket 41. Bracket 45 is moved to align edge 55 of bracket 45 with an indicia mark corresponding to the desired clearance. Bolts 30 and jam nuts 49, 50 are tightened to lock grid plate assembly in position. Even if a bolt 30 loosens during operating, bracket 45 (hence clearance C) is prevented from movement by bolt 47 which connects the two brackets together in a fixed spaced relationship.

It can be seen from the above that the present invention provides a safe, reliable, and quick means for adjusting the clearance between the drum and a rod grid plate assembly of an extractor unit.

What is claimed is:

1. An extractor unit for removing trash from cotton lint, said extractor comprising:
   a housing having two opposed side walls;
   at least one drum mounted for rotation within said housing between the insides of said opposed side walls and having saw-like teeth thereon;
   a grid plate assembly positioned in front of and spaced from said teeth on said drum and adapted to contact and separate said trash from said cotton lint as said cotton lint and said trash passes through the clearance between said grid plate assembly and said drum; said grid plate assembly comprises:
   a pair of end plates; and
   a plurality of parallel rods connecting said end plates together; and
   means for accurately adjusting said clearance between said grid plate assembly and said drum and locking said grid plate assembly at said clearance, said adjusting means being mounted on the outside of said side walls and fully operable from the outside of said housing without requiring access to the inside of said housing;
   said adjusting means comprising:
   a plurality of adjustment assemblies, a separate adjustment assembly being mounted on the outside of each of said side walls and positioned to cooperate with respective said end plates of said grid plate assembly for moving said grid plate assembly towards or away from said drum and for locking said grid plate assembly at said clearance.

2. The extractor of claim 1 wherein said adjusting means includes:

indicia means provided on the outside of said side walls adjacent each of said adjustment assemblies for accurately indicating the existing clearance between said grid plate assembly and said drum.

3. The extractor of claim 2 wherein each of said adjustment assemblies comprise:
   an elongated slot through said side wall of said housing and positioned over one of said end plates of grid plate assembly;
   a support on the outside of said side wall and positioned over said elongated slot;
   a threaded member passing through said elongated slot and slidable therein for connecting said support to said end plate of said grid plate assembly;
   another support spaced from said elongated slot and fixed to the outside of said side wall;
   adjustable means for connecting said supports together.

4. The extractor of claim 3 wherein said indicia means is positioned on the outside of said side wall adjacent said support whereby a reference point on said support will align with an indicia mark of said indicia means to indicate said then existing clearance btween said grid plate assembly and said drum.

5. The extractor of claim 4 wherein said support comprises:
   an L-shaped bracket having an opening in one leg thereof through which said threaded member passes and an opening through the other leg thereof through which said adjustable means passes;
   and wherein said another support comprises:
   an L-shaped bracket having one leg fixed to said side wall and having an opening through the other leg thereof through which said adjustable means passes.

6. The extractor of claim 5 wherein said adjustable means comprises:
   an all-thread bolt;
   a lock nut for securing said bolt to said support; and
   a pair of jam nuts, one on either side of said other leg of said another support to adjustably secure said adjustable means to said another support.

7. The extractor of claim 6 wherein said indicia means comprises:
   a decal having a set of indicia marks on the front side thereof and having an adhesive backing.

8. An adjustment assembly for an extractor of the type having a housing with two opposed side walls, a drum having saw-like teeth thereon rotatably mounted between said side walls, and a grid plate assembly having a pair of end plates joined together by a plurality of parallel rods, said end plate held in place within said housing by threaded members passing through respective elongated slots in said side walls of said housing, said extractor being capable of separating trash from cotton lint as it passes through a clearance between said grid plate assembly and said teeth on said drum, said adjustment assembly comprising:
   a first support adapted to be fixed to the outside of said side wall of said housing at a point spaced from one of said elongated slots in said side wall;
   a second support adapted to lie over said one of said elongated slots;
   a threaded member adapted to pass through and being slidable within said one of said elongated slots to connect said second support to said end plate of said grid plate assembly which underlies said elongated slot;
   an adjustable means adapted to connect said first and second supports together in spaced relationship; and
   indicia means adapated to be positioned on said side wall adjacent said first support so that a reference point on said first support will align with a proper indicia to indicate said clearance at that position of said first support.

9. The adjustment assembly of claim 8 wherein said first support comprises:
   an L-shaped bracket having one leg fixed to said side wall and having an opening through the other leg thereof through which said adjustable means passes;
   and wherein said second support comprises:
   an L-shaped bracket having an opening in one leg thereof through which said threaded member passes and an opening through the other leg thereof through which said adjustable means passes.

10. The adjustment assembly of claim 9 wherein said adjustable means comprises:
    an all-threaded bolt;
    a lock nut for securing said bolt to said support; and
    a pair of jam nuts, one on either side of said other leg of said another support to adjustably secure said adjustable means to said another support.

11. The adjustment assembly of claim 10 wherein said indicia means comprises:
    a decal having a set of indicia marks on the front and having an adhesive backing.

12. The method of installing a means for adjusting the clearance between a grid plate assembly and the drum of an existing extractor which is capable of separating trash from cotton lint as it passes through said clearance, said adjusting means being capable of being fully operable from outside the housing of the extractor, said method comprising;
    removing the adjusting bolt that normally secures said grid plate assembly in a fixed but adjustable position within the housing from its elongated slot in said side wall of said housing;
    securing an L-shaped bracket to said grid plate assembly by passing a threaded member through an opening in one leg of said bracket, through said elongated slot, and into the threaded opening on said grid plate assembly from which said adjusting bolt was removed;
    providing a hole in said side wall at a point spaced from said elongated slot and lying on an extension of the longitudinal axis of said slot;
    securing another L-shaped bracket to said side wall by passing a threaded member through an opening in one leg of said bracket and through the hole in said side wall;
    connecting said brackets together by passing an all-thread bolt through aligned openings in the other legs of the respective brackets;
    securing said all-thread bolt to said bracket; adjustably securing said all-thread bolt to said another bracket by a pair of jam nuts;
    positioning a feeler gauge between said grid plate assembly and said drum to adjust the clearance therebetween to a value determined by the known value of the gauge;

providing indicia on the side wall adjacent said bracket whereby a reference point on said bracket is aligned with an indicia mark representative of said known value; and tightening said thread member and said jam nuts to lock said grid plate assembly in place.

13. The method of claim 12 including:
repeating said installation steps for each adjusting bolt of said grid plate assembly.

* * * * *